(12) United States Patent
Lee et al.

(10) Patent No.: US 10,792,863 B2
(45) Date of Patent: Oct. 6, 2020

(54) CLEANING MECHANISM AND CLEANING METHOD OF 3D PRINTER

(71) Applicants: XYZPRINTING, INC., New Taipei (TW); KINPO ELECTRONICS, INC., New Taipei (TW)

(72) Inventors: Yang-Teh Lee, New Taipei (TW); Jia-Yi Juang, New Taipei (TW); Yi-Chu Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 272 days.

(21) Appl. No.: 15/828,413

(22) Filed: Nov. 30, 2017

(65) Prior Publication Data

US 2019/0061255 A1    Feb. 28, 2019

(30) Foreign Application Priority Data

Aug. 31, 2017    (CN) .......................... 2017 1 0770558

(51) Int. Cl.
| | |
|---|---|
| *B29C 64/35* | (2017.01) |
| *B33Y 10/00* | (2015.01) |
| *B33Y 40/00* | (2020.01) |
| *B29C 64/118* | (2017.01) |
| *B08B 1/00* | (2006.01) |

(52) U.S. Cl.
CPC .............. *B29C 64/35* (2017.08); *B08B 1/005* (2013.01); *B29C 64/118* (2017.08); *B33Y 10/00* (2014.12); *B33Y 40/00* (2014.12)

(58) Field of Classification Search
CPC ...................................................... B29C 64/35
See application file for complete search history.

(56) References Cited

U.S. PATENT DOCUMENTS

2015/0158254 A1    6/2015  Chang

FOREIGN PATENT DOCUMENTS

| CN | 101850615 A | 10/2010 |
|---|---|---|
| JP | H06255116 A | 9/1994 |

(Continued)

OTHER PUBLICATIONS

Search Report dated Nov. 9, 2018 of the corresponding European patent application.

(Continued)

*Primary Examiner* — Larry W Thrower
(74) *Attorney, Agent, or Firm* — Chun-Ming Shih; HDLS IPR Services

(57) ABSTRACT

A cleaning mechanism of a 3D printer including a cleaning module, a first wiper, a second wiper, and a carrier is provided. The cleaning module has a top plane. The first wiper is arranged corresponding to the cleaning module and protruding beyond the top plane. The second wiper is arranged on the cleaning module and protruding beyond the top plane. The carrier is connected to a rail and suspended above the cleaning module. A modeling nozzle corresponding to the first wiper and a painting pen corresponding to the second wiper are arranged on the carrier and movable. The modeling nozzle and the painting pen are arranged respectively aligned to the first wiper and the second wiper. The modeling nozzle is allowed to move pass the first wiper and bypass the second wiper. The painting pen is allowed to move pass the second wiper and bypass the first wiper.

7 Claims, 8 Drawing Sheets

(56) References Cited

FOREIGN PATENT DOCUMENTS

| | | |
|---|---|---|
| JP | 2009045898 A | 3/2009 |
| KR | 20160109706 A | 9/2016 |
| TW | 201116414 A | 5/2011 |
| WO | 2016143942 A1 | 9/2016 |
| WO | 2017009830 A1 | 1/2017 |
| WO | 2017137851 A2 | 8/2017 |

OTHER PUBLICATIONS

Search Report dated Aug. 3, 2018 of the corresponding European patent application.

CLEANING MECHANISM AND CLEANING METHOD OF 3D PRINTER

BACKGROUND OF THE INVENTION

Technical Field

The present disclosure relates to a cleaning mechanism and a cleaning method of a FDM (Fused Deposition Modeling) 3D printer, in particular to a cleaning mechanism and a cleaning method able to clean a modeling nozzle and a painting pen at the same time.

Description of Related Art

A conventional colorful 3D printer includes a modeling nozzle for outputting melted plastic materials and a painting pen for painting by jetting ink. Therefore, a cleaning module is arranged in the 3D printer for cleaning the modeling nozzle and the painting pen. The modeling nozzle and the painting pen are wiped by wiper(s) and thereby cleaned. The modeling nozzle is a high temperature component and the painting pen output acid or alkaline paints, and a heat and corrosion resistant material is expensive and not suitable for manufacturing the disposable wiper. Accordingly, an arrangement including a heat-resistant wiper and a corrosion-resistant wiper respectively corresponding to the modeling nozzle and the painting pen is a common solution. However, the modeling nozzle and the painting pen of the aforementioned arrangement should be cleaned respectively at respective locations.

In views of this, in order to solve the above disadvantage, the present inventor studied related technology and provided a reasonable and effective solution in the present disclosure.

SUMMARY OF THE INVENTION

The present disclosure provides a cleaning mechanism and a cleaning method which are able to clean the modeling nozzle and the painting pen of a 3D printer at the same time.

The present disclosure provides a cleaning mechanism of a 3D printer; the cleaning mechanism includes a cleaning module, a first wiper, a second wiper and a carrier. The cleaning module has a top plane. The first wiper is arranged corresponding to the cleaning module and protruding beyond the top plane. The second wiper is arranged on the cleaning module and protruding beyond the top plane. The carrier is connected to a rail and thereby moveable and suspended above the cleaning module. A modeling nozzle corresponding to the first wiper and a painting pen corresponding to the second wiper are arranged on the carrier and synchronously driven by the carrier to perform a linear shuttle movement. The modeling nozzle and the painting pen are arranged respectively aligned to the first wiper and the second wiper in a moving direction of the linear shuttle movement, the modeling nozzle is moveable to pass and contact the first wiper and bypass the second wiper, the painting pen is moveable to pass and contact the second wiper and bypass the first wiper.

According to the cleaning mechanism of a 3D printer of the present disclosure, in a direction perpendicular to the top plane, a lowest portion of the painting pen is arranged above a lowest portion of the modeling nozzle. In the direction perpendicular to the top plane, a contact area between the painting pen and the corresponding second wiper is smaller than a contact area between the modeling nozzle and the corresponding first wiper.

According to the cleaning mechanism of a 3D printer of the present disclosure, multiple second wipers and multiple corresponding painting pens could be provided, the painting pens are arranged corresponding to the respective second wipers and the respective painting pens are moveable to pass and contact the respective corresponding second wipers.

According to the cleaning mechanism of a 3D printer of the present disclosure, the first wiper and the second wiper are respectively made of different materials. The first wiper is made of a heat-resistant material. The second wiper is made of a corrosion-resistant material.

According to the cleaning mechanism of a 3D printer of the present disclosure, the second wiper contacts a bottom plane of the painting pen. The modeling nozzle is of cone shape, and the contact area between the first wiper and the modeling nozzle is defined from a root of the modeling nozzle to a tip of the modeling nozzle.

According to the cleaning mechanism of a 3D printer of the present disclosure, the second wiper is elevatable to protrude beyond the top plane of the cleaning module. A cover corresponding to the painting pen is arranged on the top plane of the cleaning module, the painting pen is moved by the carrier to the cover and covered by the cover, the modeling nozzle is located between the first wiper and the second wiper and separated from the second wiper when the painting pen is located at a location corresponding to the cover.

The present disclosure further provides a cleaning method of the 3D printer, the cleaning method includes the following steps: providing a cleaning module, a first wiper, a second wiper and a carrier, the cleaning module has a top plane, the first wiper is arranged corresponding to the cleaning module and protruding beyond the top plane, the second wiper is arranged on the cleaning module and protruding beyond the top plane, the carrier is connected to a rail and thereby moveable and suspended above the cleaning module, a modeling nozzle corresponding to the first wiper and a painting pen corresponding to the second wiper are arranged on the carrier; moving the carrier along the rail to move the painting pen into a region between the first wiper and the second wiper; moving the carrier along the rail to synchronously drive the modeling nozzle and the painting pen to linearly move back and forth and the painting pen is thereby driven to move back and forth to pass and contact the second wiper, and the modeling nozzle is moved pass and contacted with the first wiper while the painting pen is moving back and forth to pass the second wiper.

According to the cleaning method of a 3D printer of the present disclosure, the second wiper is excluded from a moving range of the modeling nozzle, and the first wiper is excluded from a moving range of the painting pen. In a direction perpendicular to the top plane, a lowest portion of the painting pen is arranged above a lowest portion of the modeling nozzle. In the direction perpendicular to the top plane, a contact area between the painting pen and the corresponding second wiper is smaller than a contact area between the modeling nozzle and the corresponding first wiper.

According to the cleaning method of a 3D printer of the present disclosure, multiple second wipers and multiple corresponding painting pens could be provided, the painting pens are arranged corresponding to the respective second wipers and the painting pens are moveable to pass and contact the respective corresponding second wipers.

According to the cleaning method of a 3D printer of the present disclosure, the second wiper contacts a bottom plane of the painting pen. The modeling nozzle is of cone shape, and the contact area between the first wiper and the modeling nozzle is defined from a root of the modeling nozzle to a tip of the modeling nozzle. The second wiper is elevatable to protrude beyond the top plane of the cleaning module to contact the painting pen.

According to the cleaning method of a 3D printer of the present disclosure, a cover corresponding to the painting pen is arranged protruding beyond the top plane of the cleaning module, and a step d is further included: moving the carrier along the rail to move the painting pen to a location corresponding to the cover and covering the painting pen by the corresponding cover.

According to the cleaning mechanism of the present disclosure, the cleaning module thereof includes the first wiper and the second wiper respectively corresponding to the modeling nozzle and the painting pen, and the cleaning mechanism is therefore able to implement the cleaning method of the present disclosure. The modeling nozzle could be wiped by the first wiper while wiping the painting pen by the second wiper.

BRIEF DESCRIPTION OF DRAWING

The present disclosure can be more fully understood by reading the following detailed description of the embodiment, with reference made to the accompanying drawings as follows.

DETAILED DESCRIPTION OF THE INVENTION

Figure 1:
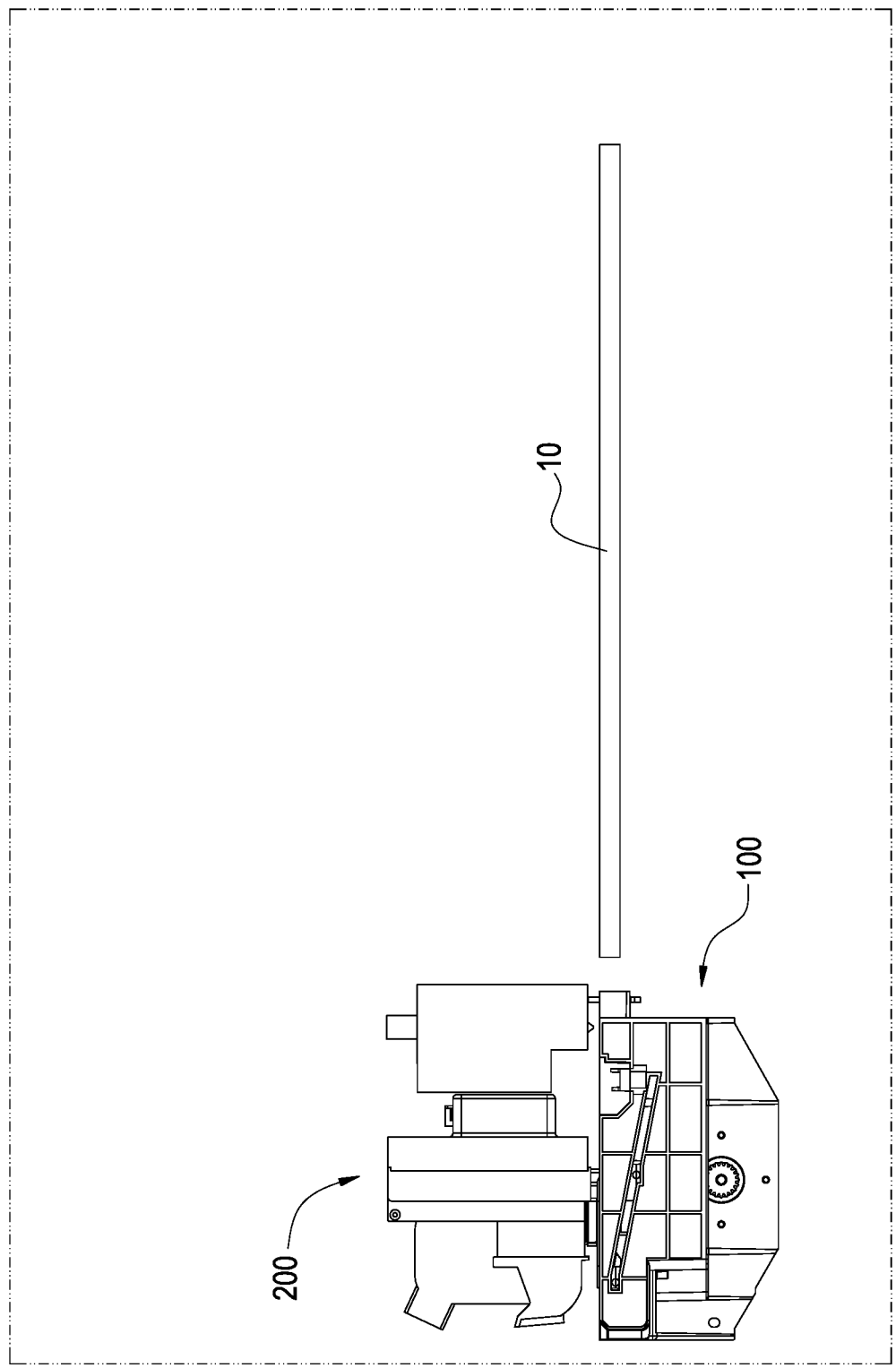
FIGS. 1 to 3 are schematic views showing a cleaning mechanism of a 3D printer of the present disclosure.
Figure 2:
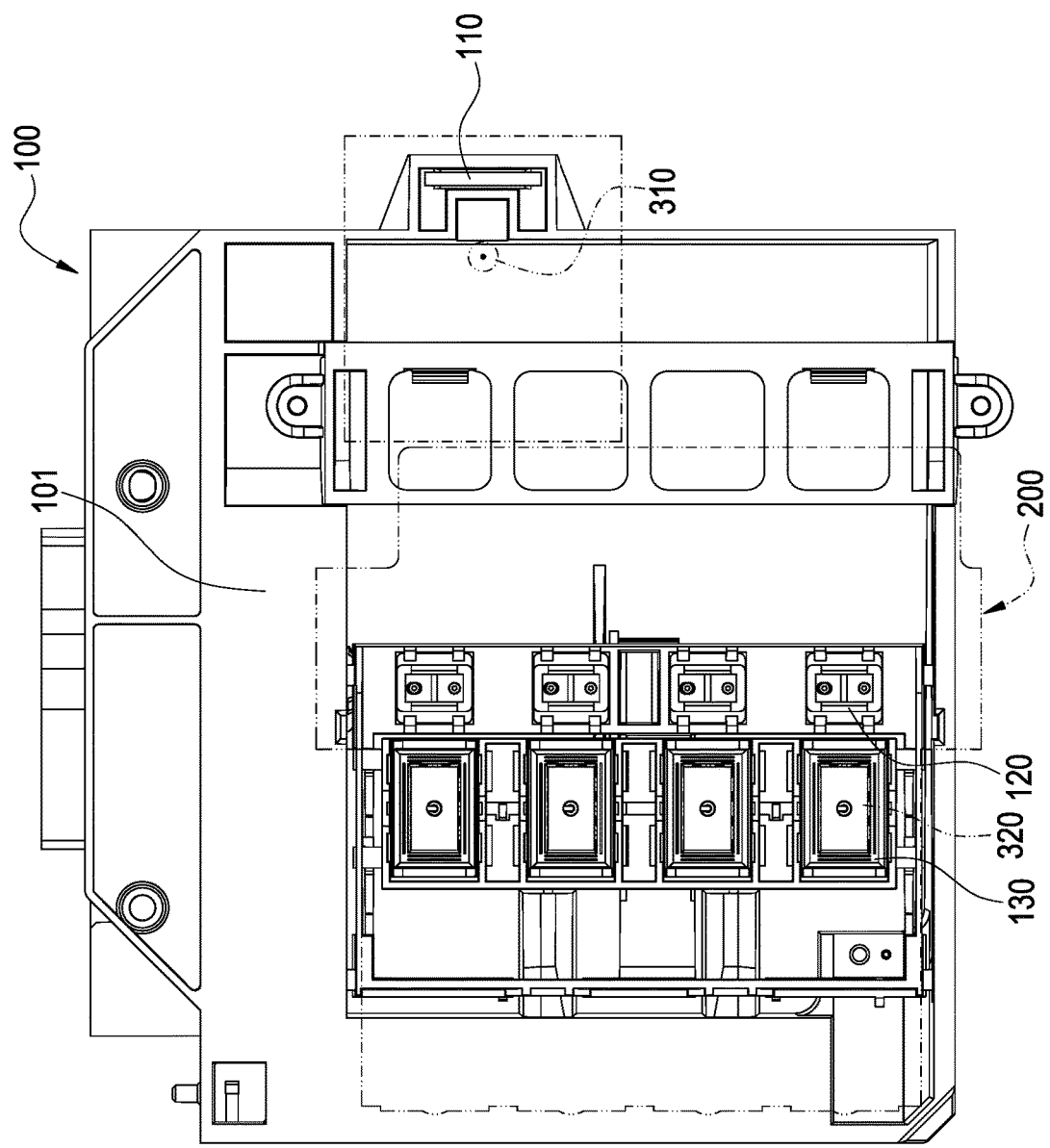

According to FIGS. 1 to 4, a cleaning mechanism of a 3D printer and a cleaning method of the 3D printer implemented via the cleaning mechanism are provided in an embodiment of the present disclosure.

The cleaning mechanism of the present disclosure is arranged in the 3D printer and preferably located at a side of a modeling platform 10 of the 3D printer. The cleaning mechanism of the present disclosure at least includes cleaning module 100, a carrier 200, a modeling nozzle 310 and at least a painting pen 320. According to the present embodiment, the modeling nozzle 310 is preferably of cone shape, multiple painting pens 320 are preferably provided, and the painting pens 320 are the same as each other in structure and function. Therefore, only one of the painting pens 320 is described later.

The cleaning module 100 includes a top plane 101, and a first wiper 110 and at least a second wiper 120 are arranged corresponding to and protruding beyond the top plane 101 top plane 101 (protruding from the top plane 101 itself or protruding beyond an extension plane thereof). According to the present embodiment, a first wiper 110 corresponding to the modeling nozzle 310, at least a second wiper 120 corresponding to the painting pen 320 and at least a cover 130 are arranged on and protruding beyond the top plane 101 of the cleaning module 100. The second wiper 120 is preferably located between the first wiper 110 and the cover 130. According to the present embodiment, the first wiper 110 and the second wiper 120 are preferably arranged together on the cleaning module 100. However, scope of the present disclosure should not be limited to the embodiment, the first wiper 110 could be alternatively arranged separated from the cleaning module 100 (for example at an edge of the modeling platform 10 or another place in the 3D printer) and protruding beyond the top plane 101. According to the present embodiment, multiple second wipers 120 the same as each other in structure and function are preferably arranged on the cleaning module 100 corresponding to the aforementioned painting pens 320. Therefore, only one of the second wipers 120 and one of the corresponding painting pens 320 are described later. The second wiper 120 could be arranged fixed, and the second wiper 120 alternatively could be elevatable to protrude beyond the top plane 101 of the cleaning module 100. The first wiper 110 and the second wiper 120 are respectively made of different materials. According to the present embodiment, the first wiper 110 is made of a heat-resistant material corresponding to the modeling nozzle 310 and therefore able to withstand high a temperature of the modeling nozzle 310; and the second wiper 120 is made of a corrosion-resistant material corresponding to the painting pen 320 and the second wiper 120 is thereby prevent from being corroded by acid or alkaline paints staining on the painting pen 320. Multiple covers 130 the same as each other and corresponding to aforementioned respective painting pens 320 are preferably arranged on the cleaning module 100, each cover 130 is elevatable and could protrude beyond the top plane 101 of the cleaning module 100 or alternatively descend into the cleaning module 100, and only one of the covers 130 and one of the corresponding painting pen 320 are described later.

The carrier 200 is connected to a rail (no shown in FIGS.) of the 3D printer and thereby suspended above the cleaning module 100, and the carrier 200 is moveable along the rail. According to the present embodiment, the carrier 200 is moveable along the rail within a given plane and to a location over the cleaning module 100.

According to FIGS. 4 to 7, the modeling nozzle 310 is arranged on the carrier 200 corresponding to the first wiper 110 and thereby able to be moved by the carrier 200. Therefore, the modeling nozzle 310 could be moved to the location over the cleaning module 100 and separated from the top plane 101 of the cleaning module 100. The modeling nozzle 310 could be moved between the first wiper 110 and the second wiper 120, and further moved pass and contact the first wiper 110 and bypass the second wiper 120. The modeling nozzle 310 is driven by the carrier 200 to linearly move back and forth to pass the first wiper 110, and the first wiper 110 is thereby driven to wipe the modeling nozzle 310. The contact area between the first wiper 110 and the modeling nozzle 310 is defined from a root of the modeling nozzle 310 to a tip of the modeling nozzle 310.

The painting pen 320 is arranged on the carrier 200 corresponding to the second wiper 120 and thereby driven to move by the carrier 200. Therefore, the painting pen 320 could be moved to a location over the cleaning module 100 and separated from the top plane 101 of the cleaning module 100. The painting pen 320 could move between the first wiper 110 and the second wiper 120, further pass and contact the second wiper 120 and bypass the first wiper 110. Accordingly, the second wiper 120 preferably contacts a bottom plane of the painting pen 320. The painting pen 320 is driven by the carrier 200 to linearly move back and forth to pass the second wiper 120, and the bottom plane of the painting pen 320 is thereby wiped by the second wiper 120.

In a direction perpendicular to the top plane 101 of the cleaning module 100, a lowest portion of the painting pen 320 is arranged above a lowest portion of the modeling nozzle 310. It is because that the plastic material is output from the tip of the modeling nozzle 310 and the modeling nozzle 310 is therefore directly contacted with the model, and the painting pen 320 is separated from the model in contrast and thereby allowed to jet paints onto the model.

Furthermore, liquid paints output from the bottom plane of the painting pen 320, only the bottom plane painting pen 320 is therefore stained with the paints, and the second wiper 120 should wipe only the bottom plane of the painting pen 320; although the plastic materials are output from the tip of the modeling nozzle 310, the lateral surface of the modeling nozzle 310 tends to be stained with the melted plastic material squeezed by a model of the first wiper 110, and the first wiper 110 should wipe not only the tip of the modeling nozzle 310 but also a lateral surface of the modeling nozzle 310. Therefore, in a direction perpendicular to the top plane 101 of the cleaning module 100, a contact area between the painting pen 320 and the corresponding second wiper 120 is smaller than a contact area between the modeling nozzle 310 and the corresponding first wiper 110.

Accordingly, the modeling nozzle 310 and the painting pen 320 are synchronously driven by the carrier 200 to perform a linear shuttle movement, and the modeling nozzle 310 and the painting pen 320 respectively aligned to the first wiper 110 and the second wiper 120 in a moving direction of the linear shuttle movement. Therefore, the first wiper 110 and the second wiper 120 respectively wipe the modeling nozzle 310 and the painting pen 320 while the modeling nozzle 310 and the painting pen 320 are linearly moving back and forth. Moreover, the painting pen 320 is moved to the cover 130 by the carrier 200 and the cover 130 is elevated to protrude beyond the cover the top plane 101 of the cleaning module 100 to cover the corresponding painting pen 320. When the painting pen 320 is located at the corresponding cover 130, the modeling nozzle 310 is located between the first wiper 110 and the second wiper 120 and separated from the second wiper 120.

According to FIGS. 4 to 8, a cleaning method of the 3D printer implemented by the aforementioned cleaning mechanism of the 3D printer is further provided in the present disclosure, the cleaning method includes the following steps:

The aforementioned cleaning mechanism of the 3D printer is firstly provided in step a, the aforementioned cleaning mechanism includes a cleaning module 100, a carrier 200, a modeling nozzle 310 and a painting pen 320, and the cleaning module 100 includes a first wiper 110, second wiper(s) 120 and cover(s) 130. Structures of the cleaning mechanism have been detailly described and would not be repeat.

In a step b following the step a, the carrier 200 is moved along the rail and the painting pen 320 is thereby moved into the region between the first wiper 110 and the second wiper 120.

In a step c following the step b, the carrier 200 is moved along the rail to cause the modeling nozzle 310 and the painting pen 320 to move synchronously and perform a linear shuttle movement. Thereby, the painting pen 320 passes back and forth to contact with the second wiper 120 during the linear shuttle movement and the second wiper 120 wipes the bottom plane of the corresponding painting pen 320. Moreover, when the painting pen 320 is moved back and forth to pass the corresponding second wiper 120, the modeling nozzle 310 is passes back and forth to contact the lateral surface of the first wiper 110 and the first wiper 110 thereby wipes the lateral surface of the modeling nozzle 310 from the root of the modeling nozzle 310 to the tip of the modeling nozzle 310. In particular, the moving direction of the synchronous linear shuttle movement of the modeling nozzle 310 and the painting pen 320 is perpendicular to a direction of the painting pen 320 moving into the region between the first wiper 110 and the second wiper 120. Therefore, the first wiper 110 is excluded from a route of the painting pen 320 moving into a region between the first wiper 110 and the second wiper 120, and the first wiper 110 is therefore prevented from corroded by paints staining on the painting pen 320.

Figure 3:
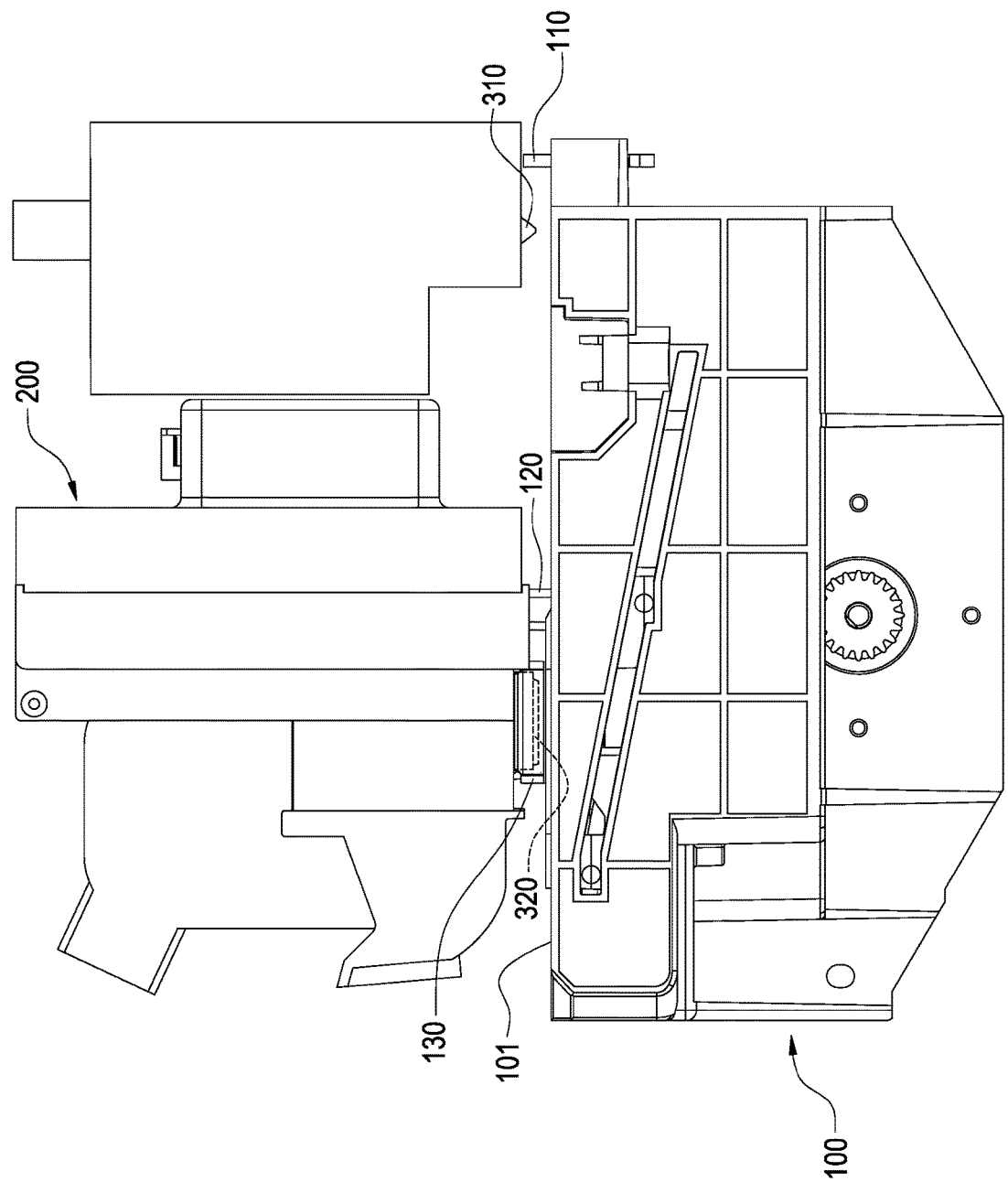
Figure 4:
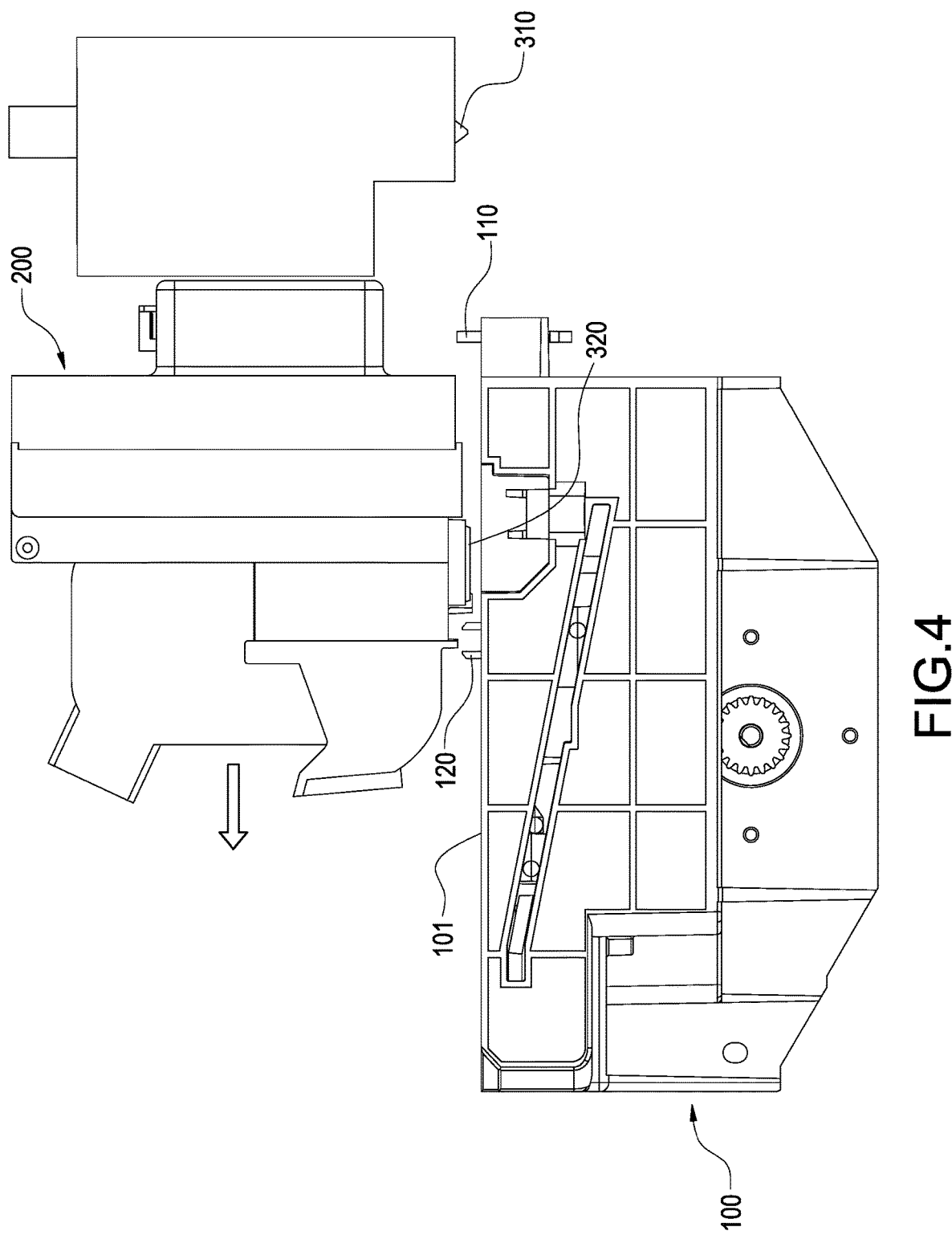
FIGS. 4 to 7 are schematic views showing steps of the cleaning method implemented by the cleaning mechanism of the 3D printer of the present disclosure.
Figure 5:
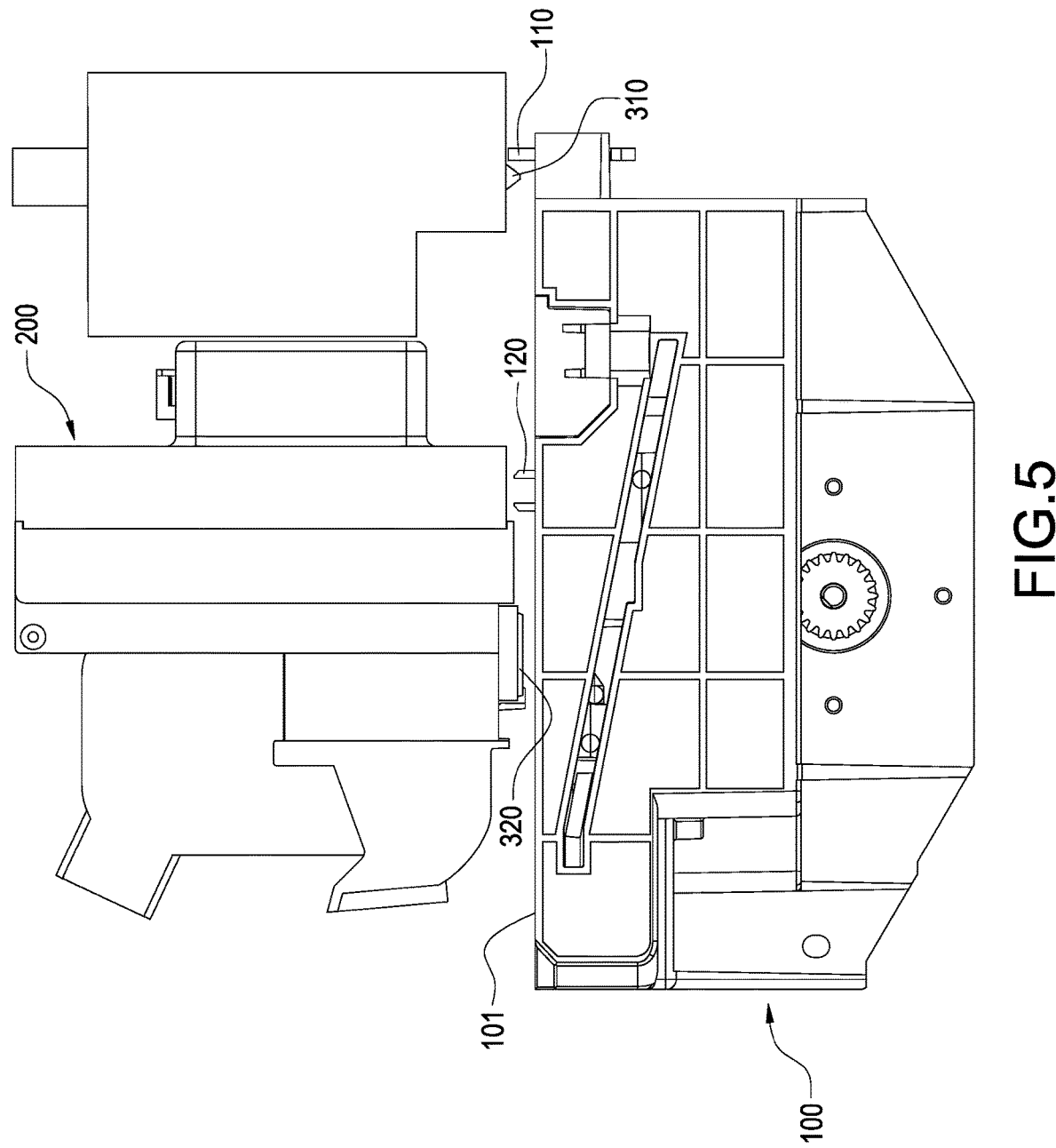
Figure 6:
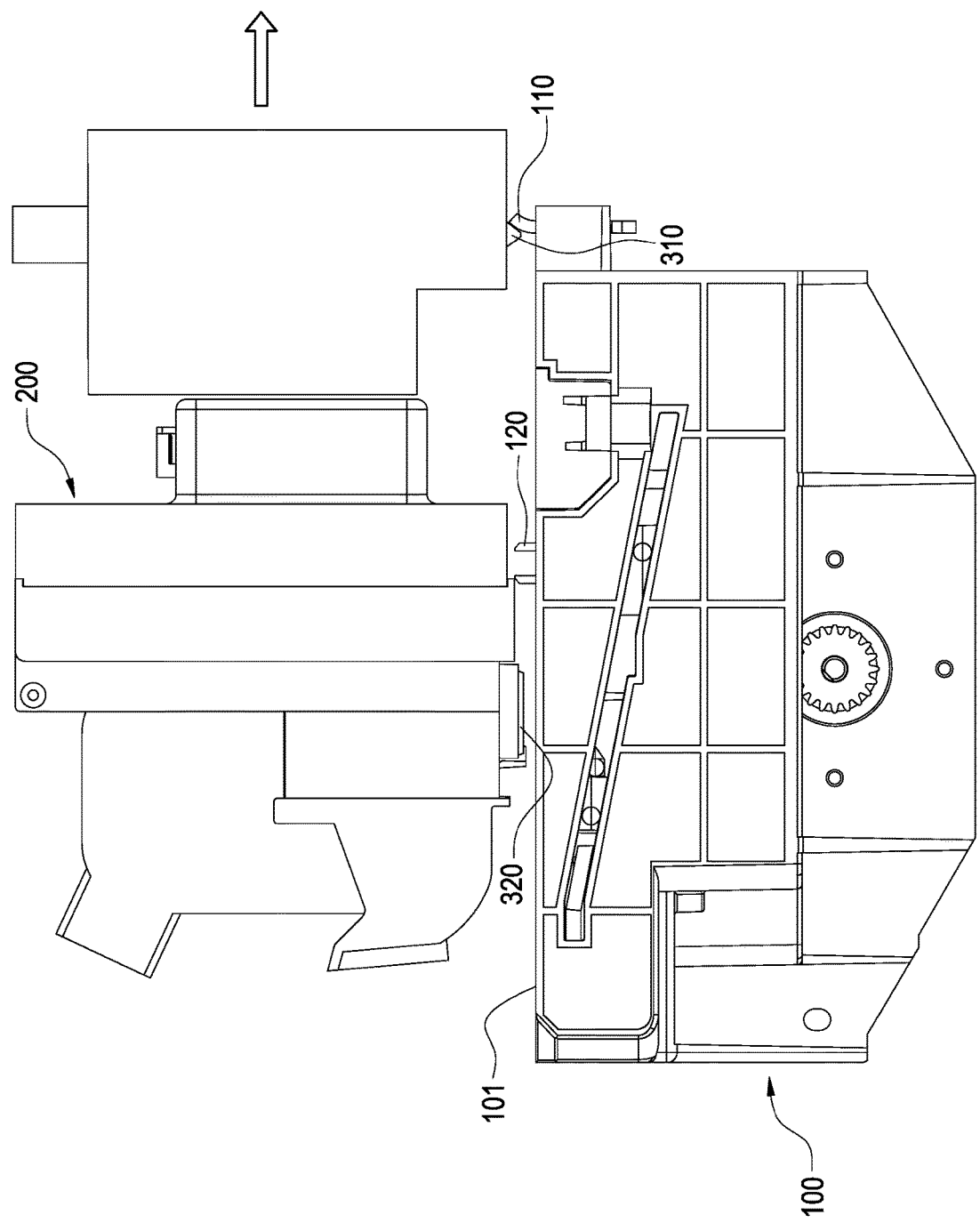
Figure 7:
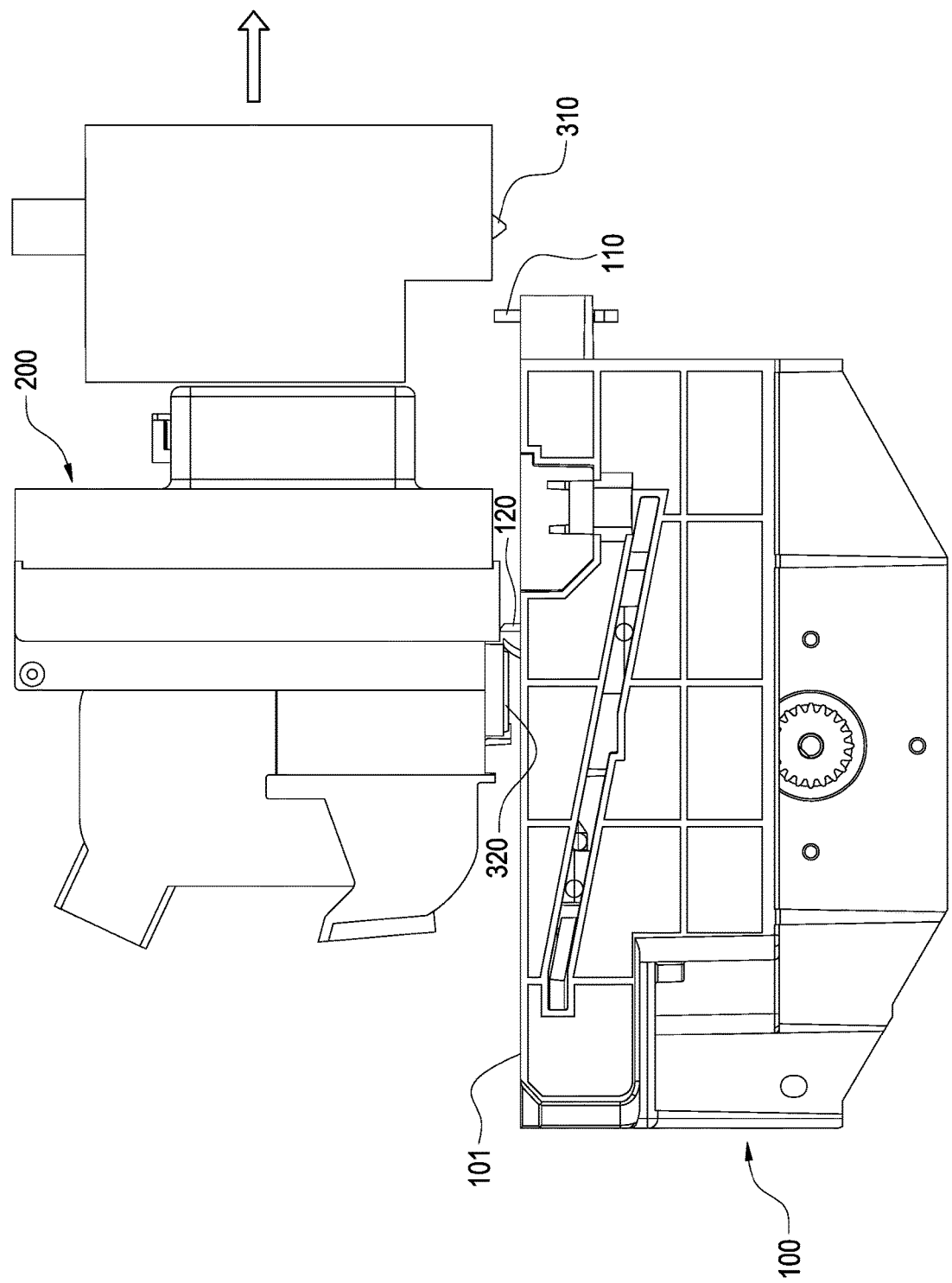
Figure 8:
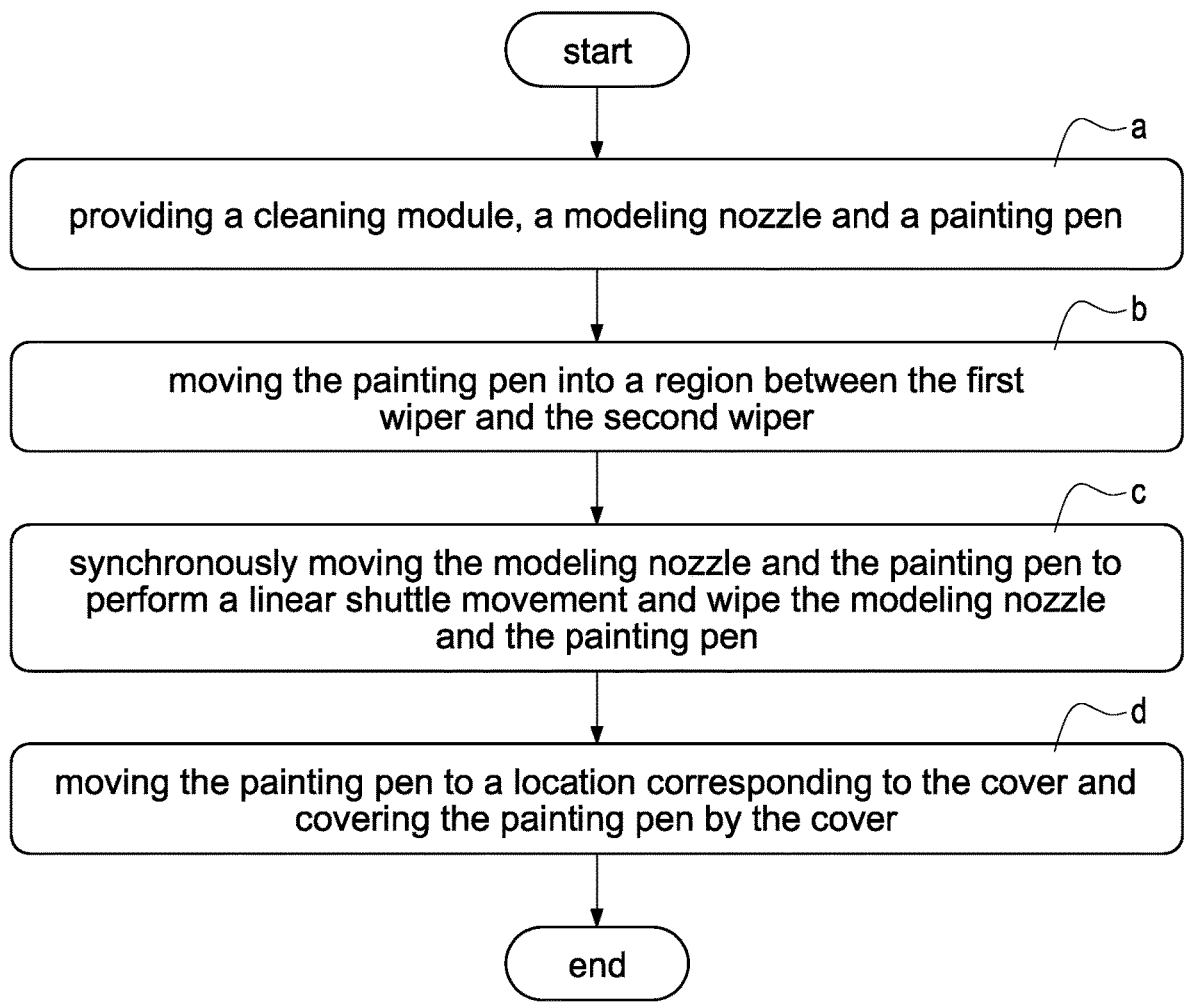
FIG. 8 is a flow chart showing the cleaning method of the 3D printer of the present disclosure.

According to FIGS. 3 and 8, in a step c following the step b, the carrier 200 is moved along the rail to move the painting pen 320 to a location corresponding to the cover 130. Then, the painting pen 320 is covered by the corresponding cover 130.

According to the cleaning mechanism of the present disclosure, a first wiper 110 and second wipers 120 respectively corresponding to the modeling nozzle 310 and the painting pens 320 are arranged on the cleaning module 100. Therefore, the cleaning method of the present disclosure could be implemented by the cleaning mechanism; the first wiper 110 wipes to clean the modeling nozzle 310 while the second wipers 120 wipe to clean the painting pens 320.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A 3D printer having cleaning mechanism, comprising:
   a cleaning module having a top plane;
   a first wiper arranged corresponding to the cleaning module and protruding beyond the top plane;
   a second wiper arranged on the cleaning module and protruding beyond the top plane; and
   a carrier connected to a rail and thereby moveable and suspended above the cleaning module, a modeling nozzle corresponding to the first wiper and a painting pen corresponding to the second wiper being arranged on the carrier and synchronously driven by the carrier to perform a linear shuttle movement;
   wherein, the modeling nozzle and the painting pen are arranged respectively aligned to the first wiper and the second wiper in a moving direction of the linear shuttle movement, the carrier is configured such that the modeling nozzle is moved to pass and contact the first wiper and bypass the second wiper, the painting pen is moved to pass and contact the second wiper and bypass the first wiper.

2. The 3D printer having cleaning mechanism according to claim 1, wherein in a direction perpendicular to the top plane, a lowest portion of the painting pen is arranged above a lowest portion of the modeling nozzle.

3. The 3D printer having cleaning mechanism according to claim 1, wherein in a direction perpendicular to the top plane, a contact area between the painting pen and the corresponding second wiper is smaller than a contact area between the modeling nozzle and the corresponding first wiper, the second wiper contacts a bottom plane of the painting pen, the modeling nozzle is of cone shape, and the contact area between the first wiper and the modeling nozzle is defined from a root of the modeling nozzle to a tip of the modeling nozzle.

4. The 3D printer having cleaning mechanism according to claim 1, wherein a plurality of second wipers and a plurality of corresponding painting pens are provided, the painting pens are arranged corresponding to the respective second wipers, and the respective painting pens are movable to pass and contact the respective corresponding second wipers.

5. The 3D printer having cleaning mechanism according to claim 1, wherein the first wiper and the second wiper are respectively made of different materials, the first wiper is made of a heat-resistant material, and the second wiper is made of a corrosion-resistant material.

6. The 3D printer having cleaning mechanism according to claim 1, wherein the second wiper is elevatable to protrude beyond the top plane of the cleaning module.

7. The 3D printer having cleaning mechanism according to claim 1, wherein a cover corresponding to the painting pen is arranged on the top plane of the cleaning module, the painting pen is moved by the carrier to the cover and covered by the cover, the modeling nozzle is located between the first wiper and the second wiper and separated from the second wiper when the painting pen is located at a location corresponding to the cover.

* * * * *